United States Patent [19]

Ogawa et al.

[11] 4,098,972

[45] * Jul. 4, 1978

[54] METHOD FOR BULK POLYMERIZATION OF VINYL CHLORIDE

[75] Inventors: Kinya Ogawa; Kazuhiko Kurimoto, both of Hazaki; Yoshitugu Eguchi; Satoshi Kuwata, both of Kamisu, all of Japan

[73] Assignee: Shin-Etsu Chemical Co., Ltd., Tokyo, Japan

[*] Notice: The portion of the term of this patent subsequent to Apr. 5, 1994, has been disclaimed.

[21] Appl. No.: 667,303

[22] Filed: Mar. 16, 1976

[30] Foreign Application Priority Data

Mar. 24, 1975 [JP] Japan .................................. 50/35076
Mar. 31, 1975 [JP] Japan .................................. 50/38988

[51] Int. Cl.² ........................... C08F 2/02; C08F 14/06
[52] U.S. Cl. ......................................... 526/62; 526/74; 526/344; 528/484
[58] Field of Search ................. 526/62, 74; 528/484

[56] References Cited

U.S. PATENT DOCUMENTS

| 3,515,709 | 6/1970 | Nelson et al. ........................... 526/62 |
| 3,778,423 | 12/1973 | Reiter ...................................... 526/62 |
| 3,926,910 | 12/1975 | Mowdood ............................... 526/74 |
| 4,016,341 | 4/1977 | Ogawa et al. ........................... 526/62 |
| 4,024,330 | 5/1977 | Morningstar et al. .................. 526/62 |

FOREIGN PATENT DOCUMENTS

| 2,105,579 | 4/1972 | France ..................................... 526/62 |
| 2,357,869 | 5/1974 | Fed. Rep. of Germany .......... 526/74 |
| 30,343 | 10/1970 | Japan ...................................... 526/74 |

*Primary Examiner*—Alan Holler
*Attorney, Agent, or Firm*—Bierman & Bierman

[57] ABSTRACT

Vinyl chloride monomers or a monomeric mixture composed mainly of vinyl chloride is bulk-polymerized in a polymerization vessel. The inner walls and other surfaces of said vessel, coming into contact with the monomer or monomers, are coated with one or more specifically selected inorganic or organic compounds having a solubility greater than 0.5 g in 100 g of water at 25° C and a boiling point higher than 60° C. This bulk polymerization method serves to greatly reduce the deposition of polymer scale on the vessel walls and other surfaces. In addition the polymer scale deposited can be readily separated and removed by merely washing with water or gas under pressure. The present method provides high quality polymers.

36 Claims, No Drawings

METHOD FOR BULK POLYMERIZATION OF VINYL CHLORIDE

BACKGROUND OF THE INVENTION

This invention relates to an improved method for the bulk polymerization of vinyl chloride monomer or a monomeric mixture composed mainly of vinyl chloride.

In the prior art bulk polymerization of vinyl chloride, it is known that polymer scale deposits on the inner walls of a polymerization vessel and the surfaces of agitator blades and other implements in contact with the monomer. It is therefore necessary to clean the polymerization vessel and the implements after each or several of the polymerization runs. The removal of such scale usually requires a great deal of labor and time. Furthermore, the deposition of polymer scale on the inner walls a polymerization vessel reduces the heat transfer of the vessel walls, resulting in lowering of the productivity. Further any released scale entering into the polymer product results in a reduction of polymer quality. Finally, the cleaning or descaling work necessary to remove the scale causes caused a very serious health problem to the workers. This is due to the toxicity of the vinyl chloride monomer absorbed in the polymer scale.

Accordingly, various attempts have been made to prevent the deposition of polymer scale in the bulk polymerization of vinyl chloride by improving design of the agitator blades and other implements. No particular success has been obtained with this approach.

OBJECTS OF THE INVENTION

It is therefore a primary object of this invention to provide a method for the bulk polymerization of a vinyl chloride monomer or a monomeric mixture composed mainly of vinyl chloride in which the deposition of polymer scale on the surfaces of polymerization reactor (i.e. the inner walls of the polymerization vessel and other surfaces coming into contact with the monomer) or monomers can be greatly reduced.

Another object of this invention is to provide a method for the bulk polymerization of a vinyl chloride monomer or a monomeric mixture composed mainly of vinyl chloride in which the production efficiency of the polymerization vessel can be remarkably increased. This is accomplished by reducing the cycle time necessary for each polymerization run.

Still another object of this invention is to provide a method for the bulk polymerization of a vinyl chloride monomer or a monomeric mixture composed mainly of vinyl chloride in which a vinyl chloride polymer or copolymer of highly improved quality can be produced easily and economically.

SUMMARY OF THE INVENTION

According to the method of the present invention, the foregoing objects can readily be attained by coating the inner walls of the polymerization vessel and other surfaces coming into contact with the monomer or monomers, prior to polymerization, with one or more of the specifically selected inorganic or organic compounds having a solubility greater than 0.5 g in 100 g of water at 25° C and a boiling point higher than 60° C.

The compounds employed in the present invention which satisfy the above conditions are selected from the compounds categorically listed below.

(a) Hydroxides of alkali metals and alkaline earth metals.
(b) Acids containing boron or silicon, metal-containing acids and alkali metal salts thereof.
(c) Phosphoric acid, polymetaphosphoric acids and polyphosphoric acids.
(d) Alkali metal salts of carbonic acid, phosphoric acid, polymetaphosphoric acids and polyphosphoric acids.
(e) Sulfates, nitrates and halides of metals other than those belonging to Group V of the Periodic Table, and double salts thereof.
(f) Thiocyanates, ferrocyanides and ferricyanides of alkali metals and double salts thereof.
(g) Carboxylic acids, aminocarboxylic acids, organic sulfonic acids, and alkali metal salts thereof.
(h) Polyvalent aliphatic alcohols.
(i) Phenols and derivatives thereof.
(j) Water-soluble high polymers.
(k) Water soluble surface active agents.
(l) Water-soluble dyes.
(m) Other water-soluble organic and inorganic compounds.

DETAILED DESCRIPTION OF THE PREFERRED EMBODIMENTS

The following are examples of each of the groups of compounds listed above.

(a) Hydroxides of alkali metals and alkaline earth metals: lithium hydroxide, sodium hydroxide, potassium hydroxide, strontium hydroxide and barium hydroxide. Magnesium hydroxide and calcium hydroxide are not suitable because of their low solubulity in water.

(b) Acids containing boron or silicon, metal-containing acids and alkali metal salts thereof: boric acid; borates, silicates, titanates, chromates, bichromates, manganates, permanganates, molybdates, tungstates, phosphotungstates, phosphomolybdates, aluminates and stannates of alkali metals selected from sodium, lithium and potassium.

(c) Phosphoric acid, polymetaphosphoric acids and polyphosphoric acids: (ortho)phosphoric acid, hypophosphorous acid, hypodiphosphoric acid, phosphoric acid, diphosphorous acid, pyrophosphorous acid, hypophosphoric acid, ultraphosphoric acid, polymetaphosphoric acids represented by the general formula $(HPO_3)_m$, where m is an integer from 1 to 12 inclusive, such as metaphosphoric acid, trimetaphosphoric acid, tetrametaphosphoric acid and hexametaphosphoric acid; and polyphosphoric acids represented by the general formula $H_{n+2}P_nO_{3n+1}$, where n is a positive integer of at least 2, such as pyrophosphoric acid, triphosphoric acid and tetraphosphoric acid.

(d) Alkali metal salts of carbonic acids, phosphoric acid, polymetaphosphoric acids and polyphosphoric acids: lithium carbonate, sodium carbonate, potassium carbonate, sodium phosphate, potassium phosphate, sodium metaphosphate, sodium trimetaphosphate, sodium tetrametaphosphate, sodium hexametaphosphate, sodium pyrophosphate, sodium triphosphate and sodium tetraphosphate.

(e) Sulfates, nitrates and halides of metals other than those belonging to Group V of the Periodic Table and double salts thereof: lithium sulfate, lithium nitrate, lithium chloride, sodium sulfate, sodium nitrate, sodium chloride, sodium fluoride, sodium bromide, sodium iodide, potassium sulfate, potassium nitrate, potassium chloride, potassium fluoride, potassium bromide, potassium iodide, copper sulfate, copper nitrate, copper chloride, silver nitrate, magnesium sulfate, magnesium nitrate, magnesium chloride, calcium nitrate, calcium chloride, barium nitrate, barium chloride, zinc sulfate, zinc nitrate, zinc chloride, aluminum sulfate, aluminum nitrate, aluminum chloride, titanium sulfate, tin sulfate, tin nitrate, tin chloride, iron sulfate, iron nitrate, iron chloride, nickel sulfate, nickel nitrate, nickel chloride, cobalt sulfate, cobalt nitrate, cobalt chloride, chromium sulfate, chromium nitrate, chromium chloride, molybdenum chloride, manganese sulfate, manganese nitrate, manganese chloride, platinum sulfate, platinum nitrate, platinum chloride, strontium nitrate, strontium chloride, sulfates of rare earth elements, nitrates of rare earth elements, chlorides of rare earth elements, zirconium sulfate, zirconium nitrate, zirconium chloride, tungsten chloride, Mohr's salt, potassium alum, sodium alum, ammonium alum and ammonium iron alum.

(f) Thiocyanates, ferrocyanides and ferricyanides of alkali metals and double salts thereof: sodium thiocyanate, potassium thiocyanate, sodium ferrocyanide, potassium ferrocyanide, potassium ferricyanide and Reinecke's salt.

(g) Carboxylic acids, aminocarboxylic acids and organic sulfonic acids and alkali metal salts thereof: formic acid, acetic acid, oxalic acid, tartaric acid, succinic acid, maleic acid, salicylic acid, 1-naphthylamine-2-sulfonic said, 2-nitrobenzenesulfonic acid, glycolic acid, gluconic acid; glutamic acid and formates, acetates, oxalates, tartrates, benzoates, succinates, maleates, salicylates, alkylbenzenesulfonates, 1-naphthylamine-2-sulfonates, 2-nitrobenzenesulfonates, gluconates, glutaminates, ethylenediaminetetraacetates, glycolates, thioglycolates and formaldehydesulfoxylates of alkali metals selected from lithium, sodium and potassium; and rongalite.

(h) Polyvalent aliphatic alcohols: glycerine, mannitol, sorbitol, glucose, ethyleneglycol, propyleneglycol and sucrose.

(i) Phenols and derivatives thereof: phenol, hydroquinone, resorcinol, pyrocatechol, pyrogallol, 2-aminophenol and 3-aminophenol.

(j) Water-soluble high polymers: gelatine, gum Arabic and starch as the natural high polymers, sodium salt of carboxymethylcellulose and methylcellulose as the semisynthetic high polymers and polyethylene oxide, polyvinyl alcohol, polyacrylamide and polyacrylic acid as the synthetic high polymers.

(k) Water-soluble surface active agents: polyoxyethylene sorbitan fatty acid esters, such as, polyoxyethylene sorbitan monostearate and polyoxyethylene sorbitan monolaurate; polyoxyethylene fatty acid esters, such as, polyoxyethylene stearate and polyoxyethylene laurate; aliphatic alcohol ethers of polyoxyethylene, such as, polyoxyethylene lauryl ether and polyoxyethylene cetyl ether; polyoxyethylene alkyl phenyl ethers, such as, polyoxyethylene nonyl phenyl ether and polyoxyethylene octyl phenyl ether; and polyoxyethylene glycerin fatty acid esters, such as, polyoxyethylene glycerin monostrearate as the water-soluble non-ionic surface active agents; alkali metal salts of higher fatty acids, such as, sodium stearate; alkali metal salts of organic sulfonic acids, such as, sodium 4-dodecylbenzene sulfonate; and alkali metal salts of alkylsulfuric acids, such as, sodium laurylsulfate as the water-soluble anionic surface active agents; alkylamine salts, such as, laurylamine hydrochloride and dodecylamine acetate; alkyl pyridinium salts, such as, cetyl pyridinium chloride and cetyl pyridinum bromide; and quaternary ammonium salts, such as, alkyl dimethyl benzyl ammonium chloride and cetyl trimethyl ammonium bromide as the water-soluble cationic surface active agents; and glycine derivatives and polyaminomonocarboxylic acid derivatives as the water-soluble ampholytic surface active agents.

(1) Water-soluble dyes: Acid Fast Black BR, Acid Complex Green BL, Acid Cyanamine Green G, Light Green SF and Soluble Blue I as the water-soluble acid dyes; Chrome Yellow G, Chrome Yellow M, Chrome Blue Black BC, Chrome Brown RH, Fast Light Yellow G, Acid Fast Yellow R and Alizarin Red as the water-soluble acid mordant dyes; Astrazon Yellow 3G, Astrazon Yellow 5G, Basic Cyanine 6G, Methylene Blue, Basic Furanin 8G and Methyl Violet as the water-soluble basic dyes; Direct Fast Brown, Brown RT, Direct Dark Green B, Direct Copper Blue BB, Direct Sky Blue 5B, Direct Fast Blue G and Direct Violet N as the water-soluble direct dyes; and Procion Yellow HA, Remazol Yellow G and Remazol Red 3B as the water-soluble reactive dyes.

(m) Other water-soluble organic and inorganic compounds: purpureo salt, aniline anhydrochloride, guanidine carbonate and sulfamic acid.

In accordance with this invention, at least one compound selected from the above described compounds is applied over the various surfaces coming into contact with monomer or monomers (i.e. the inner walls of the polymerization vessel,) the surfaces of the agitator shaft and blades and the surfaces of other auxiliary implements, such as, a condenser, a heat exchanger, valves, conduit pipes, sensor probes and baffles,) followed by drying when the compound is in the form of a solution. Then the monomer or monomers are charged into the thus coated vessel and bulk polymerization is started in the presence of a polymerization initiator.

The coating compounds according to this invention may be dissolved in a solvent, if necessary, depending on the nature of this compounds. Examples of the solvents useful for the purpose include water, alcohols, such as, methanol and ethanol, esters, such as, ethyl acetate, and ketones, such as, acetone and methylethylketone.

Coating operations can be performed by a customary method, for example, brush coating or spray coating. In other words, any known conventional coating techniques may be employed. The coating operation is preferably followed by drying, especially when the coating compound is employed as a solution, by heating at a temperature from about between room temperature to 100° C for about between 30 minutes to 2 hours.

The quantity of the coating compounds used in the present process may vary from about between 0.005 to 500 g/m$^2$. The preferred range is from about between 0.05 to 100 g/m$^2$. If the quantity is less than the minimum, the prevention of scale is not adequate and descaling is somewhat difficult. On the other hand, if the quantity of the coating compound exceeds the maximum, the quality of the resultant polymer products is reduced.

The techniques used for bulk polymerization of the monomer or monomers are conventional. Namely, after the coating operation is finished, the air within the polymerization vessel is replaced with nitrogen. Then the monomer or monomers and the polymerization initiator are charged into the vessel and the polymerization is started under agitation by elevating the temperature.

The method of the present invention is applicable not only to the homopolymerization of a vinyl chloride monomer in bulk, but also to the copolymerization of vinyl chloride monomer with other copolymerizable monomers in bulk. Examples of the copolymerizable monomers are vinyl halides other than vinyl chloride, such as, vinyl fluoride and vinyl bromide; olefins, such as, ethylene, propylene and n-butene; vinyl esters, such as, vinyl acetate, vinyl propionate and vinyl laurate; olefinically unsaturated acids and their esters, such as, acrylic acid, methacrylic acid, itaconic acid, ethyl acrylate and methyl methacrylate; vinyl ethers, such as, methylvinyl ether and ethylvinyl ether; unsaturated dibasic acids and their derivatives, such as, maleic acid, fumaric acid and maleic anhydride; vinyl aromatics, such as, styrene and α-methylstyrene; unsaturated nitriles, such as, acrylonitrile and methacrylonitrile; and vinylidene halides, such as, vinylidene chloride and vinylidene fluoride. When these comonomers are employed in combination with vinyl chloride, the amount of the comonomers is usually less than 50% by weight of the total amount of the monomer mixture.

The polymerization initiators suitable for use in the method of the present invention are preferably free-radical initiators soluble in the monomer. Examples are acyl peroxides, such as, lauroyl peroxide and benzoyl peroxide; peroxyesters of organic acids, such as, tert-butyl peroxypivalate; peroxydicarbonates, such as, di-isopropyl peroxydicarbonate, di-sec-butyl peroxydicarbonate and di-2-ethylhexyl peroxydicarbonate; azo compounds, such as, azobisisobutyronitrile, azobismethoxydimethyl valeronitrile and azobisdimethyl valeronitrile; and acylalkylsulfonylperoxides, such as, acetylcyclohexyl sulfonylperoxide. The polymerization initiators are employed usually in an amount ranging from between about 0.005% to 3% by weight based on the weight of the monomer or monomer mixture.

The type of vessel used in the bulk polymerization of the present process is not critical. It reactor suitable for polymerization of a polymerization mixture composed mostly of the monomer or monomers without the use of a substantial amount of a liquid medium to effect heat removal and formation of monomer droplets. The vessel proper is usually glass-lined or made of stainless steel and equipped with a condenser, an agitator, a heat exchanger, a pump, valves, conduit pipes, measuring instruments, baffles and other components. Naturally, polymerization vessels with lining materials other than glass or stainless steel, (e.g., synthetic resins) may be employed. The reactor is preferably free of those areas which are difficult or impossible to coat with the desired compounds. The process of bulk polymerization in accordance with the present invention may be performed in either a single-stage or two-stage operation.

According to the present method the deposition of polymer scale on the inner walls and other surfaces is greatly reduced. When a small amount of scale deposition is found on the walls, the scale can be readily removed by merely washing with a relatively low pressure stream of water or blowing with a gas jet. Thus, it is not necessary to disassemble the reactor; in order to regain satifactorily clean surfaces with a vivid metallic luster. Therefore time and labor necessary for the cleaning the polymerization reactor after each of the polymerization runs are greatly reduced, leading to a remarkably increased productivity of the polymerization process.

This invention will now be further illustrated by reference to the following examples.

EXAMPLE 1

A 2-liter stainless steel vertical autoclave equipped with a turbine blade agitator and a 4-liter stainless steel horizontal autoclave equipped with a frame agitator were used. The inner walls of each autoclave and other surfaces coming into contact with monomer were coated with a 5% aqueous solution of each of the compounds indicated in Table I in an amount of 2.0 g/m$^2$ as solid, followed by drying at 70° C for 1 hour.

After the oxygen inside the first autoclave was removed and replaced by nitrogen, 1,000 g of vinyl chloride monomer and 0.150 g of azobismethoxydimethylvaleronitrile were charged into the autoclave to conduct bulk polymerization. The polymerization was carried out with an agitator velocity of 1,000 rpm at 62° C for 1 hour, after which the polymerizate was transferred to the second autoclave.

A variety of pressurized streams of water were applied over the surfaces in the first autoclave after the residual monomer had been purged. The amount polymer scale deposited on the surfaces and the degree of the metallic luster retained on those surfaces after the polymer scale was removed were measured. The results are shown in Table I.

In addition, the amount of polymer scale deposited on the surfaces in the first autoclave was determined and the results shown in Table 1.

Finally, the same procedure as above was carried out except that the coating of the surfaces was omitted. These results are additionally set forth in Table I.

Table I

| Exp. No. | Compound | Amount of scale (g) | Removal of scale (see Footnote 1) | Degree of luster (see Footnote 2) |
|---|---|---|---|---|
| 1 | Sodium hydroxide | 5.9 | B | X |
| 2 | Boric acid | 6.4 | B | X |
| 3 | Sodium phosphomolybdate | 1.5 | B | X |
| 4 | Calcium chloride | 1.3 | A | X |
| 5 | Zinc chloride | 6.9 | A | X |
| 6 | Nickel chloride | 2.2 | B | X |
| 7 | Sodium borate | 2.9 | A | X |
| 8 | Sodium fluoride | 6.0 | B | X |
| 9 | Sodium aluminate | 3.9 | B | X |
| 10 | Potassium ferrocyanide | 1.6 | A | X |
| 11 | Purpureo salt | 2.8 | B | X |
| 12 | Sodium tungstate | 2.9 | A | X |
| 13 | Sodium benzoate | 3.6 | B | X |
| 14 | Sodium thioglycolate | 3.3 | B | X |
| 15 | Rongalite | 5.1 | A | Y |
| 16 | Aniline hydrochloride | 4.0 | B | Y |
| 17 | Guanidine carbonate | 7.0 | A | X |
| 18 | Pyrogallol | 0.9 | B | Y |
| 19 | Starch | 3.7 | B | X |
| 20 | Polyvinyl alcohol | 2.4 | B | X |
| 21 | Sodium laurylsulfate | 1.1 | A | Y |
| 22 | Polyethyleneoxide | 2.9 | A | X |
| 23 | Direct Pure Yellow 5G | 3.2 | A | X |
| 24 | Fast Light Yellow G | 3.0 | A | X |
| 25 | Polyoxyethylene cetyl ether | 1.8 | B | Y |
| 26 | Cetyl pyridinium chloride | 3.2 | B | Y |

Table I-continued

| Exp. No. | Compound | Amount of scale (g) | Removal of scale (see Footnote 1) | Degree of luster (see Footnote 2) |
|---|---|---|---|---|
| 27* | None | 8.5 | C | Z |

*Control.
Footnote 1:
A indicates complete removal by washing with water having a pressure of 2.0 kg/cm².
B indicates complete removal except for part of the agitator blades, by washing with water having a pressure of 2.0 kg/cm².
C indicates that the scale was hardly removed even with a water pressure of 10 kg/cm²
Footnote 2:
X indicates a vivid metallic luster.
Y indicates a slightly dull luster.
Z indicates a very dull luster.

EXAMPLE 2

The same autoclaves as in Example 1 were used as the first-stage and second-stage autoclaves in combination. The inner walls of both autoclaves and other surfaces coming into contact with monomer were coated with a 5% aqueous solution of each of the compounds indicated in Table II in an amount of 2.0 g/m² as solid. The procedure was followed by drying at 70° C for 1 hour and removal of oxygen gas by evacuation and replacement with nitrogen gas. 700 g of vinyl chloride monomer and 0.105 g of azobismethoxydimethylvaleronitrile as the polymerization initiator were changed into the treated first-stage autoclave. The agitator velocity of the above reaction was maintained at 1,000 rpm at 62° C for 1 hour. After completion of the polymerization reaction in the first-stage autoclave, the polymerizate was transferred into the similarly coated and treated second-stage autoclave containing 700 g of vinyl chloride monomer and 0.6 g of azobisdimethylvaleronitrile as the polymerization initiator. Then the bulk polymerization was continued in the second-stage autoclave with the velocity of the agitator maintained at 100 rpm at 57° C for about 8 hours.

After the reaction was completed within the second-stage autoclave, any residual monomer was purged while cooling the autoclave and the polymer was discharged from the autoclave. This was followed by satisfactorily dissipating any adsorbed monomer. Then, the same polymer scale removal operations were carried out in as in Example 1 to observe the extent of the polymer scale removal and the degree of metallic luster exhibited on the resulting surfaces. The results are shown in Table II.

On the other hand, the polymer product obtained from the second-stage autoclave was put on a 10-mesh screen (the Tyler Standard) to determine the amount of polymer particles coarser than 10 mesh. The amount of such coarse particles taken together with the amount of polymer scale deposited on the surfaces in the second-stage autoclave are shown in Table II under the heading "Scale and coarse particles". Further the amount of polymer scale deposition within the first-stage autoclave was separately determined.

In comparison, the same procedure as above was carried out except that the coating of the surfaces was omitted. The results are set forth in the same table.

According to the experiments using the coated autoclaves, polymer scale could readily be removed by merely washing with pressurized water for up to 5 minutes. This process produced surfaces having the same metallic luster as that observed prior to the coatings. In contradistinction, the control showed inner walls and agitator surfaces of both the first-stage and second-stage autoclaves having a very thick polymer buildup, which was hardly removed by washing with water having a pressure as high as 10 kg/cm². Further, the metallic luster of the surfaces could be regained only after the polymer buildup was scraped off by a metal knife, followed by polishing with sandpaper. This added procedure took 1 to 1.5 hours.

Table II

| Exp. No. | Compound | Scale with 1st-stage autoclave (g) | Scale and coarse particles with 2nd-stage autoclave (g) | Removal of scale (see Footnote 1) | Degree of luster (see Footnote 2) |
|---|---|---|---|---|---|
| 28 | Sulfamic acid | 2.5 | 75 | B | Y |
| 29 | Phosphomolybdic acid | 2.1 | 57 | A | X |
| 30 | Sodium silicate | 6.8 | 110 | A | X |
| 31 | Aluminum chloride | 1.5 | 63 | B | X |
| 32 | Magnesium chloride | 0.9 | 57 | B | X |
| 33 | Potassium thiocyahide | 0.7 | 51 | B | Y |
| 34 | Sodium bichromate | 1.6 | 56 | B | X |
| 35 | Potassium permanganate | 1.3 | 53 | B | X |
| 36 | Mohr's salt | 1.9 | 61 | B | X |
| 37 | Reinecke's salt | 0.9 | 51 | B | X |
| 38 | Potassium alum | 1.5 | 62 | B | X |
| 39 | Potassium ferricyanide | 1.3 | 58 | A | X |
| 40 | Sodium 1-naphthylamine-2-sulfonate | 2.8 | 75 | C | Y |
| 41 | Disodium ethylenediaminetetraacetate | 0.9 | 63 | A | X |
| 42 | Resorcinol | 0.7 | 50 | C | Y |
| 43 | Methyl cellulose | 0.8 | 55 | A | X |
| 44 | Sodium polyoxyethylenelauryl sulfate | 1.5 | 57 | A | Y |
| 45 | Sodium di-2-ethylhexylsulfosuccinate | 3.0 | 94 | B | X |
| 46 | Methyl Violet | 2.8 | 61 | B | X |
| 47 | Direct Fast Red F | 2.5 | 67 | B | X |
| 48* | None | 7.0 | 230 | D | Z |

*Control.
Footnote 1:
A indicates complete removal by washing with water having a pressure 1.0 kg/cm².
B indicates complete removal by washing with water having a pressure of 2.0 kg/cm².
C indicates complete removal by blowing with 2.0 kg/cm².
D indicates that the scale was hardly removed even with a water pressure of 10 kg/cm².
Footnote 2: The same as indicated in Table I.

EXAMPLE 3.

Using the same autoclaves as in Example 1, similar experiments according to the method of Example 1 except that the coating compounds indicated in Table III were employed.

In comparison, the same experimental procedure was repeated, employing the coating compounds indicated in Table III having a lower water-solubility in the form of an aqueous suspension.

The results of the experiments are set forth in Table III.

Table III

| Exp. No. | Compound | Amount of scale (g) | Removal of scale (see Footnote 1) | Degree of luster (see Footnote 2) |
| --- | --- | --- | --- | --- |
| 49 | Calcium chloride | 1.3 | A | X |
| 50 | Potassium benzoate | 3.5 | A | X |
| 51 | Sodium fluoride | 3.8 | B | Y |
| 52* | Calcium sulfate | 5.5 | D | Z |
| 53* | Calcium hydrogen-phosphate | 4.7 | E | Z |
| 54* | Isophthalic acid | 5.3 | C | Z |
| 55* | Hydroxyterephthalic acid | 5.9 | C | Z |

*Control.

Footnote 1: The removal of scale was carried out in each experiment by washing with water having a pressure of 2.0 kg/cm².
A indicates complete removal.
B indicates complete removal except for part of the inner walls and part of the agitator blades.
C indicates removal from about half of the inner walls but none from the agitator blades.
D indicates partial removal only.
E indicates that the scale was hardly removed.
Footnote 2: The same as indicated in Table I.

EXAMPLE 4.

Using the same combination of autoclaves as in Example 2, experiments were carried out in a similar manner to example 2 except that the coating compounds indicated in Table IV were employed in the varying amounts specified in the same table.

In comparison, the same experimental procedure as above was repeated, employing the same coating compounds in smaller amounts.

The results of the experiments are set forth in Table IV.

Table IV

| Exp. No. | Compound | Amount of coating, g/m² as solid | Scale with 1st-stage auto-clave (g) | Scale and coarse particles with 2nd-stage auto-clave (g) | Removal of scale (see Footnote) |
| --- | --- | --- | --- | --- | --- |
| 56 | Sodium silicate | 0.2 | 5.9 | 120 | B |
| 57 | Sodium silicate | 2.0 | 6.8 | 110 | A |
| 58 | Sodium silicate | 20 | 7.8 | 150 | A |
| 59 | Methyl cellulose | 0.2 | 1.1 | 58 | A |
| 60 | Methyl cellulose | 2.0 | 0.8 | 55 | A |
| 61 | Methyl cellulose | 20 | 1.5 | 64 | A |
| 62* | Sodium silicate | 0.002 | 7.9 | 180 | C |
| 63* | Methyl cellulose | 0.002 | 3.4 | 79 | C |

*Control.

Footnote: A indicates complete removal by blowing with 1.0 kg/cm² or less pressure water.
B indicates complete removal by blowing with 1.0 kg/cm² pressure water.
C indicates incomplete removal by blowing with 2.0 kg/cm² pressure water.

EXAMPLE 5.

Using the same combination of autoclaves as in Example 2, experiments were performed in and under the same manner and conditions as in Example 2 except that the coating compounds were those as indicated in Table V and that the monomeric mixture employed in the first-stage autoclave consisted of 1,300 g of vinyl chloride and 100 g of vinyl acetate in the presence of 0.210 g of acetylcyclohexylsulfonyl peroxide and that the continued polymerization in the second-stage autoclave was carried out with no additional monomer but with 0.45 g of diisopropylperoxydicarbonate as the polymerization initiator.

For comparison to this example, the same experimental procedure as above was repeated except only that the coating of both autoclaves was omitted.

The results of the above experiments are set out in Table V.

It was found in connection with the comparative experiment, the inner walls of each autoclave and the surfaces of the agitator were covered throughout with a thick layer of polymer scale, which was hardly removed by blowing with as high as 10 kg/cm² pressure water. The metallic luster of the walls and surfaces could be regained only by scraping off the polymer scale with a metal knife, followed by polishing with sand paper, taking 1 to 1.5 hours of labor.

Table V

| Exp. No. | Compound | Scale with 1st-stage auto-clave (g) | Scale and coarse particles with 2nd-stage auto-clave (g) | Removal of scale (see Footnote 1) | Degree of luster (see Footnote 2) |
| --- | --- | --- | --- | --- | --- |
| 64 | Potassium permanganate | 1.5 | 58 | A | X |
| 65 | Potassium silicate | 6.1 | 110 | A | X |
| 66 | Disodium ethylenediamine tetraacetate | 1.1 | 60 | A | X |
| 67 | Sodium laurylsulfate | 1.9 | 66 | A | Y |
| 68 | Methyl cellulose | 1.5 | 59 | A | X |
| 69* | None | 7.5 | 229 | B | Z |

*Control

Footnote 1: A indicates complete removal by washing with water having a pressure of 2.0 kg/cm².
B indicates that the scale could hardly be removed by washing with water having a pressure of 2.0 kg/cm².
Footnote 2: The same as indicated in Table I.

EXAMPLE 6.

A combination of the same first-stage and second-stage autoclaves as in Example 2 was used. The inner walls of both autoclaves and other surfaces coming into contact with the monomer were coated with a 10 to 50% aqueous solution of one of the phosphorus-containing acids indicated in Table VI in an amount of 5.0 g/m² as solid. The procedure was followed by drying at 60° C for 1 hour and the removal of oxygen gas by evacuation and replacement with nitrogen gas.

With the thus coated and treated autoclaves, experiments were performed in a similar manner to Example 2 except that no additional monomer was used in the second-stage autoclave. For the purpose of removing the polymer scale from the various surfaces, a nitrogen gas jet was employed in addition to pressurized water.

In comparison, the same experimental procedure as above was repeated except that the coating of the autoclaves was omitted.

The results of the above experiments are set forth in Table VI.

It was found in connection with these experiments that, polymer scale on the various surfaces could be removed readily by a relatively low pressure stream of nitrogen gas or water. This procedure taking up to 5 minutes, produced a metallic luster on the surfaces as vivid as before the coating.

It was found in connection with the comparative experiment, that the inner walls and the surfaces of the agitators of the autoclaves were covered throughout with thick layers of polymer scale. This scale which could hardly be removed by washing with water having a pressure as high as 10 kg/cm². In addition, the metallic luster of the surfaces was regained only by scraping off the scale with a metal knife and polishing with sand paper. This procedure took 1 to 1.5 hours.

Table VI

| Exp. No. | Phosphorus-containing acid | Scale with 1st-stage auto-clave | Scale and coarse particles with 2nd-stage autoclave | Removal of Scale by: Nitrogen gas jet (see Footnote 1) | Pressure water (see Footnote 2) |
|---|---|---|---|---|---|
| | | (g) | (g) | | |
| 70 | Hypophosphorous acid | 2.0 | 80 | A | A' |
| 71 | Diphosphorous acid | 2.1 | 75 | A | A' |
| 72 | Phosphorous acid | 0.9 | 52 | B | A' |
| 73 | Hypophosphoric acid | 2.5 | 70 | A | A' |
| 74 | Orthophosphoric acid | 0.8 | 45 | B | A' |
| 75 | Trimetaphosphoric acid | 3.0 | 85 | B | A' |
| 76 | Tetrametaphosphoric acid | 2.8 | 80 | B | A' |
| 77 | Pyrophosphoric acid | 1.8 | 61 | B | A' |
| 78 | Tetraphosphoric acid | 0.9 | 50 | B | A' |
| 79* | None | 7 | 230 | C | B' |

*Control.
Footnote 1: A indicates virtually commplete removal with pressure of a 3.0 kg/cm².
B indicates virtually complete removal, except for part of the agitator blades, by the same pressure.
C indicates no removal of scale with the samme pressure.
Footnote 2: A' indicates complete removal by a pressure of 1.0 kg/cm².
B' indicates that the scale could hardly be removed by pressure of 10 kg/cm² pressure.

EXAMPLE 7.

A combination of the same first-stage and second-stage autoclaves as in Example 2 was used. The inner walls of both autoclaves and other surfaces coming into contact with monomer were coated with a 20% aqueous solution of orthophosphoric acid in the varying amounts indicated in Table VII. This procedure was followed by drying at 80° C. Then, the experiments were performed in a similar manner to the results are set forth in Table VII.

In comparison, the same experimental procedure was repeated, employing the same coating compound in a smaller amount. The results are also set forth in Table VII.

Table VII

| Exp. No. | Amount of coating, g/m² as solid | Scale with 1st-stage autoclave | Scale and coarse particles with 2nd-stage autoclave | Removal of Scale by: Nitrogen gas jet (see Footnote 1) | Pressure water (see Footnote 2) |
|---|---|---|---|---|---|
| | | (g) | (g) | | |
| 80 | 0.5 | 1.9 | 57 | A | A' |
| 81 | 5.0 | 0.8 | 45 | A | A' |
| 82 | 50 | 2.5 | 60 | B | A' |
| 83* | 0.001 | 6.0 | 130 | C | B' |

*Control.
Footnote 1: The same as indicated in Table VI.
Footnote 2: The same as indicated in Table VI.

EXAMPLE 8.

A combination of the same first-stage and second-stage autoclaves as in Example 2 was used. The inner walls of both autoclaves and other surfaces coming into contact with monomer were coated with a 30% aqueous solution of one of the phosphorus-containing acids indicated in Table VIII in an amount of 3.0 g/m² as solid, followed by drying. Then, bulk polymerization was carried out in the above autoclaves in a similar manner to Example 6.

In comparison, the same polymerization was carried out wherein the autoclave surfaces were not coated.

As a result, the amounts of polymer scale deposited within the autoclave in each experiment are shown in Table VIII.

The quality of the product produced by the present invention is set forth in Table VIII. It is shown that the present method produces a superior particle size distribution and reduces the occurrence of fish-eyes compared to the control sample.

The particle size distribution is expressed in percentages by weight of particles passing through one of the mesh screens specified in the table. The occurrence of fish-eyes is shown by the number of ungelled particles in pieces occurring over an area of 100 cm² in a sheet of the polyvinyl chloride resin having a thickness of 0.2 mm the above described sheet is, prepared by blending 100 parts by weight of polyvinyl chloride with 1.0 part by weight of lead stearate, 1.0 part by weight of barium stearate, 0.5 part by weight of titanium dioxide, 0.1 part by weight of carbon black and 50 parts by weight of dioctyl phthalate on a roller mill at 150° C for 7 minutes.

Table VIII

| Exp. No. | Coating material | Scale with 1st-stage autoclave (g) | Scale and coarse particles with 2nd-stage autoclave (g) | Particle size distribution | | | | Occurrence of fisheyes |
|---|---|---|---|---|---|---|---|---|
| | | | | 40 mesh | 60 mesh | 100 mesh | 200 mesh | |
| 84 | Phosphorous acid | 1.1 | 54 | 96.1 | 90.2 | 37.7 | 5.9 | 39 |
| 85 | Orthophosphoric acid | 0.8 | 43 | 95.2 | 92.0 | 39.6 | 5.2 | 35 |
| 86* | None | 7.0 | 230 | 91.5 | 83.5 | 36.0 | 16.0 | 190 |

*Control.

EXAMPLE 9

A combination of the same first-stage and second-stage autoclaves as in Example 2 was used. The inner walls of both autoclaves and other surfaces coming into contact with monomer were coated with an aqueous solution of one of the phosphorus-containing acid indicated in Table IX in an amount of 5.0 g/cm² as solid, after which the surface were dried.

Bulk polymerization and subsequent experiments were carried out with the thus coated first-stage and second-stage autoclaves. The first stage autoclave was charged with a monomeric mixture consisting of 1,300 g of vinyl chloride and 100 g of vinyl acetate in the presence of 0.201 g of acetylcyclosulfonyl. The second-stage polymerization was carried out with no additional monomer but with 0.40 g of diisopropylperoxydicarbonate as the polymerization initiator. The polymerization was carried out for about 6 hours. For the purpose of removing the polymer scale, a nitrogen gas jet a stream of pressurized water was employed.

In comparison, the same experimental procedure as above was repeated except that the coating of the autoclaves was omitted.

The results of the experiments are set forth in Table IX.

It was found in connection with the comparative experiment that the inner walls of the autoclaves and the surfaces of the agitator blades were thoroughly covered with firmly adhering thick layers of polymer scale. The inherent metallic luster of those surfaces could be regained only after the polymer scale was scraped off by a metal knife, followed by polishing with sand paper. The procedure took 1 to 1.5 hours.

Table IX

| Exp. No. | Coating material | Scale with 1st-stage autoclave (g) | Scale and coarse particles with 2nd-stage autoclave (g) | Removal of Scale by: | |
|---|---|---|---|---|---|
| | | | | Nitrogen gas jet (see Footnote 1) | Pressure water (see Footnote 2) |
| 87 | Phosphorous acid | 3.1 | 71 | A | A' |
| 88 | Orthophosphoric acid | 2.3 | 49 | A | A' |
| 89 | Tetraphosphoric acid | 2.7 | 54 | A | A' |
| 90* | None | 9.7 | 227 | B | B' |

*Control.
Footnote 1: A indicates virtually complete removal, except for part of the agitator blades, with a pressure of 3.0 kg/cm².
B indicates that the polymer scale could hardly be removed with the same pressure.
Footnote 2: The same as indicated in Table VI.

What is claimed is:
1. A method for the bulk polymerization of a vinyl chloride monomer or a monomeric mixture thereof with a copolymerizable monomer or monomers which comprises carrying out the polymerization in a polymerization reactor in which the inner walls and other surfaces coming into contact with the monomer or monomers are provided with coatings of a compound having a solubility greater than 0.5 g in 100 g of water at 25° C and having a boiling point higher than 60° C.
2. The method of claim 1 wherein said compound is a hydroxide of an alkali metal or an alkaline earth metal.
3. The method of claim 1 wherein said compound a boron-containing acid, a silicon-containing acid, a metal-containing acid or an alkali metal salt thereof.
4. The method of claim 1 wherein said compound is a phosphorus-containing acid.
5. The method of claim 1 wherein said compound is an alkali metal salt of an acid selected from the group consisting of carbonic acid, phosphoric acid, polymetaphosphoric acids and polyphosphoric acids.
6. The method of claim 1 wherein said compound is a salt selected from the group consisting of sulfates, nitrates and halides of metals other than the metals belonging to Group V of the Periodic Table and double salts thereof.
7. The method of claim 1 wherein said compound is a salt selected from the group consisting of thiocyanates, ferrocyanides and ferricyanides of alkali metals and double salts thereof.
8. The method of claim 1 wherein said compound is an acid selected from the group consisting of carboxylic acids, aminocarboxylic acids, organic sulfonic acids, and an alkali metal salt thereof.
9. The method of claim 1 wherein said compound is a polyvalent aliphatic alcohol.
10. The method of claim 1 wherein said compound is a water-soluble high polymer.
11. The method of claim 1 wherein said compound is a water-soluble surface active agent.
12. The method of claim 1 wherein said compound is a water-soluble organic dye.
13. The method of claim 2 wherein said hydroxide is selected from the group consisting of lithium hydroxide, sodium hydroxide, potassium hydroxide, strontium hydroxide and barium hydroxide.
14. The method of claim 3 wherein said boron-containing acid is boric acid.
15. The method of claim 3 wherein said alkali metal salt of said acids is selected from the group consisting of borates, silicates, titanates, chromates, bichromates, manganates, permanganates, molybdates, tungstates, phosphotungstates, phosphomolybdates, aluminates and stannates of alkali metals.

16. The method of claim 4 wherein said phosphorus-containing acid is selected from the group consisting of phosphoric acid, hypophosphorous acid, phosphorous acid, diphosphorous acid, pyrophosphorous acid, hypophosphoric acid, ultraphosphoric acid, polymetaphosphoric acids and polyphosphoric acids.

17. The method of claim 6 wherein said sulfate is selected from the group consisting of lithium sulfate, sodium sulfate, potassium sulfate, copper sulfate, magnesium sulfate, zinc sulfate, aluminum sulfate, titanium sulfate, tin sulfate, iron sulfate, nickel sulfate, cobalt sulfate, chromium sulfate, manganese sulfate, platinum sulfate, sulfates of rare earth elements and zirconium sulfate.

18. The method of claim 6 wherein said nitrate is selected from the group consisting of lithium nitrate, sodium nitrate, potassium nitrate, copper nitrate, silver nitrate, magnesium nitrate, calcium nitrate, barium nitrate, zinc nitrate, aluminum nitrate, tin nitrate, iron nitrate, nickel nitrate, cobalt nitrate, chromium nitrate, manganese nitrate, platinum nitrate, strontium nitrate, nitrates of rare earth elements and zirconium nitrate.

19. The method of claim 6 wherein said halide is selected from the group consisting of lithium chloride, sodium chloride, potassium chloride, copper chloride, magnesium chloride, calcium chloride, barium chloride, zinc chloride, aluminum chloride, tin chloride, iron chloride, nickel chloride, cobalt chloride, chromium chloride, molybdenum chloride, manganese chloride, platinum chloride, strontium chloride, chlorides of rare earth elements, zirconium chloride, tungsten chloride, sodium fluoride, sodium bromide, sodium iodide, potassium fluoride, potassium bromide and potassium iodide.

20. The method of claim 6 wherein said double salt is selected from the group consisting of Mohr's salt, potassium alum, sodium alum, ammonium alum and ammonium iron alum.

21. The method of claim 7 wherein said double salt is Reinecke's salt.

22. The method of claim 8 wherein said carboxylic acid is selected from the group consisting of formic acid, acetic acid, oxalic acid, tartaric acid, succinic acid, maleic acid, salicylic acid, glycolic acid and gluconic acid.

23. The method of claim 8 wherein said aminocarboxylic acid is glutamic acid.

24. The method of claim 8 wherein said organic sulfonic acid is selected from the group consisting of 1-naphthylamine-2-sulfonic acid and 2-nitrobenzenesulfonic acid.

25. The method of claim 8 wherein said alkali metal salt is selected from the group consisting of the alkali metal salts of formic acid, acetic acid, oxalic acid, tartaric acid, succinic acid, maleic acid, salicylic acid, glycolic acid and gluconic acid.

26. The method of claim 8 wherein said alkali metal salt is selected from the group consisting of the alkali metal salts of glutamic acid and ethylenediaminetetraacetic acid.

27. The method of claim 8 wherein said alkali metal salt is selected from the group consisting of the alkali metal salts of 1-naphthylamine-2sulfonic acid and 2-nitrobenzenesulfonic acid.

28. The method of claim 9 wherein said polyvalent aliphatic alcohol is selected from the group consisting of glycerin, mannitol, sorbitol, glucose, ethyleneglycol, propyleneglycol and sucrose.

29. The method of claim 10 wherein said water-soluble high polymer is selected from the group consisting of gelatin, gum Arabic, starch, sodium salt of carboxymethylcellulose, methylcellulose, polyethylene oxidle, polyvinyl alcohol, polyacrylic acid and polyacrylamide.

30. The method of claim 11 wherein said water-soluble surface active agent is selected from the group consisting of polyoxyethylene sorbitan monostearate, polyoxyethylene sorbitan monolaurate, polyoxyethylene stearate, polyoxyethylene laurate, polyoxyethylene lauryl ether, polyoxyethylene cetylether, polyoxyethylene nonyl phenyl ether, polyoxyethylene octyl phenyl ether, polyoxyethylene glycerin monostearate, sodium stearate, sodium 4-dodecylbenzene sulfonate, sodium laurylsulfate, laurylamine hydrochloride, dodecylamine acetate, cetyl pyridiniun bromide, cetyl pyridinium chloride, alkyldimethylbenzylammonium chloride and cetyltrimethylammonium bromide.

31. The method of claim 12 wherein said water-soluble organic dye is selected from the group consisting of Acid Fast Black BR, Acid Complex Green BL, Acid Cyanamine Green G, Light Green SF, Soluble Blue I, Chrome Yellow G, Chrome Yellow M, Chrome Blue Black BC, Chrome Brown RH, Fast Light Yellow G, Acid Fast Yellow R, Alizarin Red, Astrazon Yellow 3G, Astrazon Yellow 5G, Basic Cyanine 6G, Methylene Blue, Basic Furanin 8G, Methyl Violet, Direct Fast Brown, Brown RT, Direct Dark Green B, Direct Copper Blue BB, Direct Sky Blue 5B, Direct Fast Blue G, Direct Violet N, Procion Yellow HA, Remazol Yellow G and Remazol Red 3B.

32. The method of claim 1 wherein said compound is selected from the group consisting of purpureo salt, aniline anhydrochloride, guanidine carbonate and sulfamic acid.

33. The method of claim 1 wherein the amount of said coatings is in the range of from about between 0.005 to 500 g/m$^2$.

34. The method of claim 1 wherein the amount of said coatings is in the range of from about between 0.05 to 100 g/m$^2$.

35. The method of claim 1 wherein said compound is a phenol.

36. The method of claim 35 wherein said phenol compound is selected from the group consisting of hydroquinone, resorcinol, pyrocatechol, pyrogallol, 2-aminophenol and 3-aminophenol.

* * * * *